(12) United States Patent
Fellers

(10) Patent No.: US 6,662,951 B1
(45) Date of Patent: Dec. 16, 2003

(54) PROCESS FOR EXTRACTING AND PURIFYING NATURALLY OCCURRING ZEOLITE

(75) Inventor: Billy D. Fellers, Glen Rose, TX (US)

(73) Assignee: Basic Resources, Inc., Dallas, TX (US)

( * ) Notice: Subject to any disclaimer, the term of this patent is extended or adjusted under 35 U.S.C. 154(b) by 37 days.

(21) Appl. No.: 09/672,065

(22) Filed: Sep. 27, 2000

(51) Int. Cl.$^7$ .................................................. B03B 5/66
(52) U.S. Cl. ........................ 209/158; 209/9; 209/160; 209/161; 241/20; 423/700; 423/712
(58) Field of Search ...................... 209/4, 5, 9, 158, 209/160, 161, 18; 241/16, 20, 21, 23; 423/700, 712

(56) References Cited

U.S. PATENT DOCUMENTS

| | | | |
|---|---|---|---|
| 1,570,854 A | 1/1926 | Nordell | |
| 2,173,909 A | 9/1939 | Kritchevsky | 209/166 |
| 3,189,557 A | 6/1965 | Shaler | 252/428 |
| 3,206,127 A | 9/1965 | Morris et al. | 241/4 |
| 3,320,027 A | 5/1967 | Maynard et al. | 23/110 |
| 3,439,801 A | 4/1969 | Morris et al. | 209/5 |
| 3,572,500 A | 3/1971 | Kouloheris | 209/5 |
| 3,713,593 A | 1/1973 | Morris et al. | 241/27 |
| 3,891,580 A | 6/1975 | Morris et al. | 260/8 |
| 3,902,993 A | 9/1975 | Houser et al. | 209/166 |
| 3,934,825 A | 1/1976 | Delfosse et al. | 241/16 |
| 3,961,971 A | 6/1976 | Abercrombie, Jr. et al. | 106/72 |
| 3,974,067 A | 8/1976 | Nott | 209/3 |
| 3,980,240 A | 9/1976 | Nott | 241/20 |
| 3,990,642 A | 11/1976 | Nott | 241/20 |
| 4,033,863 A | 7/1977 | Stone | 209/159 |
| 4,055,485 A | 10/1977 | Nott | 209/3 |
| 4,078,941 A | 3/1978 | Bundy et al. | 106/308 N |
| 4,097,372 A | 6/1978 | Nott | 209/3 |
| 4,222,857 A * | 9/1980 | McCarthy | 209/9 |
| 4,227,920 A | 10/1980 | Chapman et al. | 75/1 R |
| 4,247,524 A | 1/1981 | Leonard | 423/118 |
| 4,252,642 A | 2/1981 | Mohri | 209/452 |
| 4,281,799 A | 8/1981 | Oder | 241/24 |
| 4,299,807 A | 11/1981 | Angel et al. | 423/327 |

(List continued on next page.)

OTHER PUBLICATIONS

Mumpton, Frederick A., Natural Zeolites: a New Industrial Mineral Commodity, A Selection of papers presented at Zeolite '76, pp. 3–24, Pergamon Press 1978.

Torii, K., Utilization of Natural Zeolites in Japan, A Selection of papers presented at Zeolite '76, pp. 441–449, Pergamon Press 1978.

*Primary Examiner*—Donald P. Walsh
*Assistant Examiner*—Daniel K. Schlak
(74) *Attorney, Agent, or Firm*—Robert J. Ward (57) ABSTRACT

A process for extracting and purifying naturally occurring zeolite from ores in the presence of other mineral phases by using mechanical dispersion and differential suspension to remove a majority of the clay content of the ore. The process continues by removal of contaminants with a higher mass to surface area ratio than that of the desired zeolite product by employing the properties of demineralized water in combination with a countercurrent flow separation column. No chemical flocculating or flotation agents are employed in the process. The process separates the particulate compound by using the separation effect of an electrical double layer which forms when the mixture is hydrated in a low electrolyte medium.

9 Claims, 3 Drawing Sheets

U.S. PATENT DOCUMENTS

| | | | | |
|---|---|---|---|---|
| 4,401,633 A | | 8/1983 | Sun | 423/118 |
| 4,401,634 A | | 8/1983 | Sun | 423/118 |
| 4,419,228 A | | 12/1983 | Cook et al. | 209/9 |
| 4,428,919 A | | 1/1984 | Stermole et al. | 423/474 |
| 4,430,209 A | | 2/1984 | Merck et al. | 209/3 |
| 4,451,440 A | | 5/1984 | Thompson, III | 423/112 |
| 4,460,477 A | * | 7/1984 | Costello et al. | 210/701 |
| 4,468,317 A | | 8/1984 | Turner, Jr. | 209/5 |
| 4,492,628 A | | 1/1985 | Young et al. | 209/5 |
| 4,510,254 A | | 4/1985 | Morris et al. | 501/146 |
| 4,533,464 A | | 8/1985 | Smith et al. | 209/158 |
| 4,554,066 A | | 11/1985 | Turbitt et al. | 209/3 |
| 4,618,374 A | | 10/1986 | Thompson, III et al. | 106/288 B |
| 4,629,556 A | | 12/1986 | Yoon et al. | 209/166 |
| 4,703,025 A | | 10/1987 | Kokotailo et al. | 502/60 |
| 4,746,421 A | | 5/1988 | Turbitt | 209/3 |
| 4,770,352 A | | 9/1988 | Takamoto et al. | 241/72 |
| 4,781,298 A | | 11/1988 | Hemstock et al. | 209/3 |
| 4,789,464 A | | 12/1988 | Kuryluk | 209/161 |
| 4,851,048 A | | 7/1989 | Jones et al. | 106/446 |
| 4,934,142 A | | 6/1990 | Hayashi et al. | 60/297 |
| 4,935,391 A | | 6/1990 | Caropreso et al. | 501/146 |
| 4,943,324 A | | 7/1990 | Bundy et al. | 106/486 |
| 4,961,843 A | | 10/1990 | Lewis | 209/210 |
| 4,989,794 A | | 2/1991 | Askew et al. | 241/16 |
| 4,997,550 A | | 3/1991 | Cob et al. | 209/166 |
| 5,061,461 A | | 10/1991 | Sennett et al. | 423/112 |
| 5,083,712 A | | 1/1992 | Askew et al. | 241/16 |
| 5,084,186 A | * | 1/1992 | Gilchrist | 210/709 |
| 5,085,707 A | | 2/1992 | Bundy et al. | 106/486 |
| 5,114,691 A | | 5/1992 | Pinnavaia et al. | 423/244 |
| 5,114,898 A | | 5/1992 | Pinnavaia et al. | 502/406 |
| 5,116,587 A | | 5/1992 | Pinnavaia et al. | 423/244 |
| 5,128,027 A | | 7/1992 | Halaka et al. | 209/5 |
| 5,132,027 A | * | 7/1992 | Ukawa et al. | 210/787 |
| 5,143,599 A | | 9/1992 | Derdall et al. | 209/166 |
| 5,151,124 A | | 9/1992 | Rice | 106/416 |
| 5,161,694 A | * | 11/1992 | Yoon et al. | 209/5 |
| 5,190,900 A | | 3/1993 | Toro et al. | 501/148 |
| 5,266,539 A | | 11/1993 | Passariello | 501/149 |
| 5,342,443 A | | 8/1994 | Forbus et al. | 106/488 |
| 5,358,701 A | | 10/1994 | Pinnavaia et al. | 423/242.1 |
| 5,391,526 A | | 2/1995 | Willis et al. | 501/146 |
| 5,397,754 A | | 3/1995 | Iannicelli et al. | 501/146 |
| 5,407,140 A | | 4/1995 | Lofthouse et al. | 241/21 |
| 5,454,865 A | | 10/1995 | Ginn et al. | 106/486 |
| 5,603,411 A | | 2/1997 | Williams et al. | 209/5 |
| 5,616,251 A | * | 4/1997 | Batarseh | 210/725 |
| 5,685,900 A | | 11/1997 | Yuan et al. | 106/487 |
| 5,785,938 A | | 7/1998 | Pinnavaia et al. | 423/244 |
| 5,804,077 A | * | 9/1998 | Smith et al. | 210/702 |
| 5,804,526 A | | 9/1998 | Satoh et al. | 502/304 |
| 5,830,818 A | | 11/1998 | Bruns et al. | 501/141 |
| 5,840,113 A | * | 11/1998 | Freeman et al. | 106/487 |
| 5,935,529 A | | 8/1999 | Saito et al. | 422/177 |
| 5,939,037 A | | 8/1999 | Hepburn et al. | 423/213.5 |
| 5,942,857 A | | 8/1999 | Ansell et al. | 60/274 |
| 5,948,376 A | | 9/1999 | Miyoshi et al. | 423/213.5 |
| 5,950,421 A | | 9/1999 | Chattha et al. | 60/274 |
| 5,964,088 A | | 10/1999 | Kinugasa et al. | 60/286 |
| 5,965,481 A | | 10/1999 | Durand et al. | 502/304 |
| 5,968,462 A | | 10/1999 | Suzuki | 423/213.2 |
| 5,968,463 A | | 10/1999 | Shelef et al. | 423/213.5 |
| 5,968,466 A | | 10/1999 | Kharas | 423/239.2 |
| 5,968,861 A | | 10/1999 | Feeley et al. | 502/74 |
| 5,972,821 A | | 10/1999 | Nojima et al. | 502/66 |
| 5,974,793 A | | 11/1999 | Kinugasa et al. | 60/285 |
| 5,976,475 A | | 11/1999 | Peter-Hoblyn et al. | 423/212 |
| 5,979,157 A | | 11/1999 | Kinguasa et al. | 60/274 |
| 5,983,628 A | | 11/1999 | Borroni-Bird et al. | 60/274 |
| 5,985,225 A | | 11/1999 | Ohtsuka et al. | 423/239.2 |
| 5,990,038 A | | 11/1999 | Suga et al. | 502/303 |
| 5,993,764 A | | 11/1999 | Tabata et al. | 423/239.2 |
| 5,996,338 A | | 12/1999 | Hirota | 60/285 |
| 6,004,521 A | | 12/1999 | Miyoshi et al. | 423/213.5 |
| 6,006,515 A | | 12/1999 | Wakamoto | 60/274 |
| 6,008,155 A | | 12/1999 | Terada et al. | 502/355 |
| 6,010,673 A | | 1/2000 | Kanazawa et al. | 423/213.5 |
| 6,027,698 A | | 2/2000 | Cha | 422/186 |
| 6,028,023 A | | 2/2000 | Vierheilig | 502/84 |
| 6,029,441 A | | 2/2000 | Mizuno et al. | 60/274 |
| 6,029,442 A | | 2/2000 | Caren et al. | 60/275 |
| 6,030,590 A | | 2/2000 | Tabata et al. | 423/239.1 |
| 6,030,916 A | | 2/2000 | Choudary et al. | 502/65 |

* cited by examiner

PROCESS FOR EXTRACTING AND PURIFYING NATURALLY OCCURRING ZEOLITE

FIELD OF THE INVENTION

This invention relates to a process that provides multi-step methods of extracting and purifying naturally occurring zeolite from zeolitic ores in the presence of other mineral phases having various properties. More specifically, this invention relates to a semi-continuous method for obtaining a highly enhanced, low bulk density zeolite product which displays increased zeolite concentration, improved brightness, elevated ion exchange capacity, and enhanced rheological properties. The present invention is practiced without the use of polymeric flocculating, dispersing, or floatation materials which result in contamination of the resultant zeolite, and includes a separate step for classifying the zeolite by particle size and mineral phase.

BACKGROUND OF THE INVENTION

Natural zeolites are hydrated aluminosilicates of alkali and alkaline earth metals. Zeolites have a crystalline structure commonly known as framework aluminosilicates with infinitely extending three dimensional networks of $AlO_4$ and $SiO_4$ tetrahedra linked to each other by the sharing of all oxygens. This three dimensional network structure provides extensive surface area within the zeolite, with up to 50% of zeolite volume attributable to the channels and cavities. This property contributes to a specific gravity that is intermediate to other mineral phases of the natural ore, which increases the difficulty of separations by prior art methods.

Natural zeolites are used in a variety of applications, including, for example, ion exchange, radioactive waste treatment, industrial waste treatment, uses as animal feed supplements, moisture absorbents, carriers for time-released substances such as pesticides or fertilizers, liquid and gas filters for contaminant and odor control, oil absorbents, and industrial coatings and fillers. Naturally occurring zeolites are also frequently used as starting material in synthetic zeolite production. Zeolites have also demonstrated usefulness as catalysts in hydrocarbon conversion reactions. The large surface area of zeolite makes it an excellent choice for such applications.

Another feature of zeolite structure is that the cavities within a particular zeolite are all of uniform shape and size. Consequently, natural zeolites may act as analogs to artificial molecular sieves.

One natural zeolite, clinoptilolite, possesses a particularly high absorbing capacity due to its large surface area. Furthermore, clinoptilolite offers a high cation exchange capacity, making it suitable for use in numerous industrial applications. The pore size of clinoptilolite makes this zeolite well suited to waste water filtration, particularly due to its demonstrated selectivity for strategic ions. Finally, the thermal and physical stability and compatibility with final waste forms, such as cement or glass, make it an attractive alternative to less stable and incompatible options such as polymer based ion exchange resins.

Naturally occurring zeolite ores are well known to contain a variety of contaminants, including, for example, clay, quartz, mica, feldspar, iron and titanium minerals and calcites. Naturally occurring zeolites have heretofore been effectively excluded from certain applications which require extreme brightness, such as in the fine paper industry where higher cost titanium dioxide, calcium carbonate or silica may be preferred additives. Furthermore, naturally-occurring zeolites are frequently passed over for use as molecular sieves or as catalysts because of ineffective purification methods.

Currently available and prior art process for extraction, purification and classification of natural zeolites are very limited and not commonly practiced. The art of clay minerals benificiation having been applied to zeolite ores includes pulverizing, dry classifying or wet gravitational separations, magnetic separation, bleaching and calcining to drive water out of the pores has proven relatively ineffective. A number of such processing techniques have been described in the prior art for zeolite applications, but have not been commercially successful. For example, in U.S. Pat. No. 4,510,254, a batch process is described in which a zeolitic ore is processed through the steps of pulverization, slurrying, removal of fines, fine milling, magnetic separation, bleaching and drying. The '254 process results in a dry finely ground zeolite having a particle size of below 2 microns and a TAPPI brightness of at least 90. Zeolite obtained from the '254 process also possesses a bulk density of about half or less of high quality kaolin clay pigments. Despite the claimed properties of zeolite obtained from the '254 process, natural zeolite deposits remain difficult to treat to sufficient purity, brightness, size discrimination and density. The overall yield of '254 process is less than 20% compared to greater than 40% for the present invention. Similarly, the zeolite content of the product obtained from the '254 process is slightly lower than the mineral source whereas the process of the present invention enhances the zeolite content by over 20%. Processes according to the prior art, including the '254 patent, typically include complex chemical methods that introduce undesirable chemical contamination as part of the purification process and generate large waste inventories having difficult and costly treatment requirements. Introduction of chemical contaminants further complicates the prior art processes by requiring intermediate steps to ameliorate the affect of such chemical contaminants. Some prior art classification techniques, such as that described in U.S. Pat. No. 5,603,411, also add undesirable chemical contaminants such as flocculating agents and dispersants. Consequently, artificially produced zeolites and polymeric resins remain the prime choice in high-end applications, such as ion exchange. Similarly, high cost minerals such as titanium dioxide and calcium carbonate are preferred over zeolite in fine paper manufacturing.

The absence of natural zeolite competition in various high end applications is largely an issue of effective and economic processes for extraction and purification from zeolite ores. There remains a need therefore, for a process which permits economical and technically sufficient exploitation of naturally occurring zeolite materials for a broad variety of applications. Furthermore, there is a need for a process which does not introduce chemical contaminants, such as flocculating or dispersing agents, and which does not produce hazardous process effluents.

SUMMARY OF THE INVENTION

The present invention provides an efficient, cost-effective process for the extraction and purification of natural zeolite, from mined ores which include clinoptilolite and mordenite, by a novel method of separation from other mineral phases present in mined ores. A process has been discovered that enables effective separation of mineral phases by mechanical dispersal and differential suspension of respective minerals according to both their physical and chemical properties. The novel process exploits the properties of demineralized water to facilitate differential suspension of fine particles without the use of dispersants or other chemical suspending agents and does not include chemical flocculating agents or floatation agents that are all common to the prior art.

The process of the present invention recognizes and exploits variation in fundamental properties of respective mineral phases including extent of hydration and influence on effective volume of particles to promote differential suspension. Demineralized water facilitates maximum electrical double layer repulsion between particles and minimizes the influence of electrolytes on the electrical double layer to preclude flocculation.

The process of the present invention first hydrates and mechanically disperses the starting material to separate out the highly hydrated clay content followed by separation of the zeolite from contaminants having a higher mass to surface area ratio than that of the desired zeolite by use of one or more countercurrent flow separation columns in which the dispersing medium is demineralized water.

The resulting purified product displays an increased zeolite concentration, improved brightness, and elevated ion exchange capacity. Further treatment with magnetic separation and fine grinding provides a high brightness and low bulk density product suitable for fine paper coatings and fillers in industrial whitening applications. The rheological properties are enhanced by removal of clay and high-density minerals. Since the residual contaminants are often near detection limits of the analytical method, the efficacy and mass balance are best confirmed in the tailings of the process where they are more concentrated. Existing chemical leaching techniques may further enhance the zeolite product. However the excellent properties from the novel process may preclude the necessity of this expensive step for many applications while raising the process yield to about 59%.

The present invention further provides a new method of wet classification of the purified zeolite stream. The wet classification system of the present invention provides a significant and substantial improvement over prior art methods of classifying fine zeolites, primarily by density difference, and also employs the properties of demineralized water and the electrical double layer of hydrated mineral phases to amplify their differences in settling velocity. The wet classification method of the present invention may be applied to other types of fines, such as in the processing of kaolin clays, finely ground mineral ores and synthetically produced zeolites.

Overall, the present invention is much less complex than the prior art and substantially contributes to cost-effectiveness through higher yields, lower capital cost and reduction of waste liabilities.

DETAILED DESCRIPTION OF THE INVENTION

Figure 1:
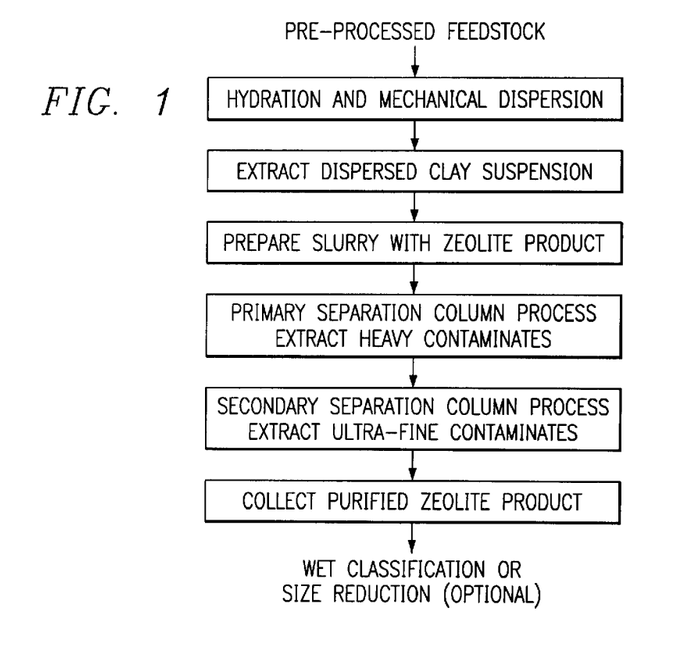
FIG. 1 is a process flow diagram of the process of the present invention, showing an optional back end wet classification step.

Referring first to FIG. 1, a process flow diagram of the process of the present invention, including a wet classification method, is shown. As shown in FIG. 1, a pre-processed feedstock is hydrated and mechanically dispersed in a first step of the present process. Once mixed with demineralized water in this first step, the highly hydrated clay fraction of the feedstock is selectively suspended in the water. The stable clay suspension is extracted or decanted from the hydration and dispersion tank. The hydration and mechanical dispersion is most preferably performed as a batch operation with one or more hydration, mixing and extracting/decanting steps preformed as mandated by the composition of the feedstock. Once the clay suspension is removed, the remaining feedstock fraction, which contains zeolite, is mixed with additional demineralized water to form a slurried zeolite process stream. The slurried zeolite process stream is piped into a primary separation column which uses a countercurrent flow of demineralized water to separate the zeolite from the heavy contaminants in the slurried zeolite process stream. The zeolite exits the primary separation column in an overflow effluent, aided by the suspending effect of demineralized water, which is then passed to a secondary separation column. The secondary separation column also uses a countercurrent flow to further purify the overflow effluent. In contrast to the primary separation column, the lower rise rate in the secondary separation column removes ultra-fine particles while permitting the purified zeolite product to drop to the bottom of the secondary separation column for collection. As indicated in FIG. 1, the purified zeolite product may be further processed by an optional wet classification method discussed later in more detail or may be subjected to additional size reduction.

The feedstock for the process of the present invention is a zeolitic material with a mean particle size of about 10 to 40 microns. Because the mined zeolitic material generally possesses a particle size greater than 40 microns, the feedstock of the process is pre-processed to obtain the desired average or mean particle size within the range of about 10 to 40 microns. Such pre-processing may be achieved by any of a number of known techniques, including crushing, milling and grinding. The clay phase is substantially liberated from the ore during this feedstock preparation and most of the liberated clay phase is reduced to a particle size from about 10 to 100 times smaller than the bulk of the fine milled particles. The feedstock is hydrated and mechanically dispersed, as a first step in separating and removing the clay fraction of the feedstock. This initial hydration and mechanical dispersion is conducted in a batch process and may involve one or more dispersal and decanting procedures depending upon the initial clay load of the feedstock.

Figure 2:
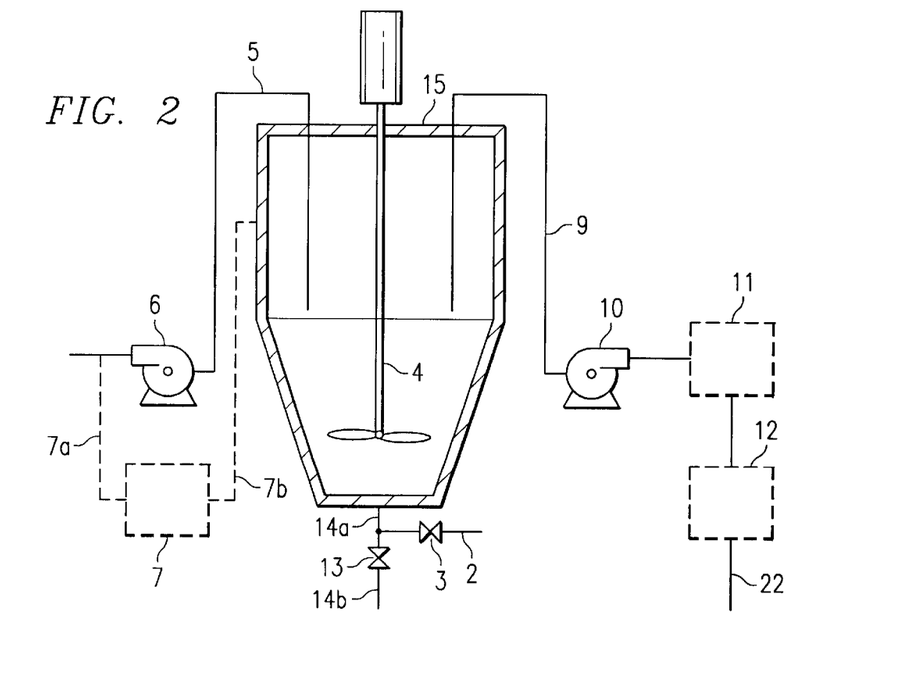
FIG. 2 is a plan view of the hydration and mechanical dispersion system.

Referring now to FIG. 2, in the preferred embodiment of the process, the clay load of the feedstock is pre-determined and sufficient demineralized water is added through line 2 and valve 3 to suspend the highly hydrated clay fraction of the feedstock in the batch. Mixing of the feedstock and demineralized water in the batch tank 15 produces a slurry. The demineralized water used possesses relatively low electrolyte content, typically less than about 10 to 50 ppm. It will be understood that demineralized water with higher electrolyte content may also be used; however separation efficiency may be reduced.

In contrast to prior art processes which require the addition of chemical additives to achieve sufficient dispersal of the liberated fine clay fraction, the process of the present invention uses no such chemical dispersants. The lack of chemical additives in the process results in enhanced physical characteristics of the process stream, including avoidance of undispersed clay agglomerates and co-agglomeration of different mineral phases.

Generally, a slurry density of 5% to 40% is obtained in the batch tank 15 with 10% to 20% being the preferred slurry density. Residence time in the batch hydration and dispersal system, which includes batch tank 15 and any recirculation streams, ranges from two to twenty-four hours and may be adjusted according to the clay and heavies load of the feedstock. Mechanical dispersal may be achieved by use of a mixer/blender 4 or a shear pump 6, both of which are known in the art. It will be understood that a high density, e.g., 40% to 60%, slurry could be prepared in a semi-continuous pre-processing to the hydration and dispersal discussed herein. In the preferred embodiment of the present invention the initial hydration occurs in the batch hydration and mechanical dispersion system with no separate preparation of a high-density slurry. Use of such a preparation step, however, is not outside the scope of the invention disclosed herein. Following hydration, mechanical dispersion, and appropriate settling period the highly hydrated and stable clay phase is decanted through line 5 with pump 6 resulting in a process stream with substantially less clay content. In the preferred embodiment of the process, the decanted zeolite product from the hydration and mechanical dispersion step contains about 5% clay or less by weight. The separated zeolite fraction may be used as a product in some industrial applications or further processed as appropriate for other applications. After removal of the hydrated clay fraction, the remaining zeolite process stream is slurried in the batch tank 15 with additional demineralized water from line 2 and valve 3 producing a slurried zeolite process stream for further processing. The hydrated clay phase, removed from batch tank 15 via line 5 and pump 6, having about 50% clay by weight, is a potentially separate product of the novel process.

Heavy contaminants and magnetic materials may also be removed in the initial hydration and dispersion system of the process. For example, magnetic separation may be imposed on a recirculation stream of the hydrated feedstock through lines 5, 7a and 7b with pump 6 and magnet 7 and may be accomplished using any of a number of prior art devices and techniques, such as those described in U.S. Pat. Nos. 3,974,067; 3,990,642; 4,055,485; 4,510,254; 4,097,372; and 4,281,799. Alternatively, magnetic separation may be imposed on the slurried zeolite process stream which is extracted from batch tank 15 through line 9 to pump 10 and magnet 11, then on to subsequent steps in the present process. It will be understood that magnetic separation may also be used at various other points in the process of the present invention to further extract magnetic components from the process stream. For example, magnetic separation may be imposed upon the overflow effluent from the primary separation column, which is discussed below.

Heavies may be removed in the hydration and dispersion system of the present process by decanting both the hydrated clay phase through line 5 with pump 6 and slurried zeolite process stream using line 9 and pump 10, leaving a tail fraction containing the heavies. Alternatively, heavies may be removed by under-flow or suction from the bottommost portion of the batch tank 15 at valve 13 through lines 14a and 14b. It will be understood that the mechanical dispersion to produce the slurried zeolite process stream, whether achieved through a shear pump or a mixer/blender, the amount of water added, and recirculation of the hydration and dispersion step may be set so as to maximize heavies removal.

The slurried zeolite process stream may then be passed through an optional centrifugal separation 12 to remove additional heavy waste materials, such as quartz. This step may be bypassed or eliminated depending upon the heavy load of the feedstock. Furthermore, it will be understood that the need for additional heavies removal may depend upon the efficacy of any heavies removal undertaken in the hydration and dispersion system.

Figure 3:
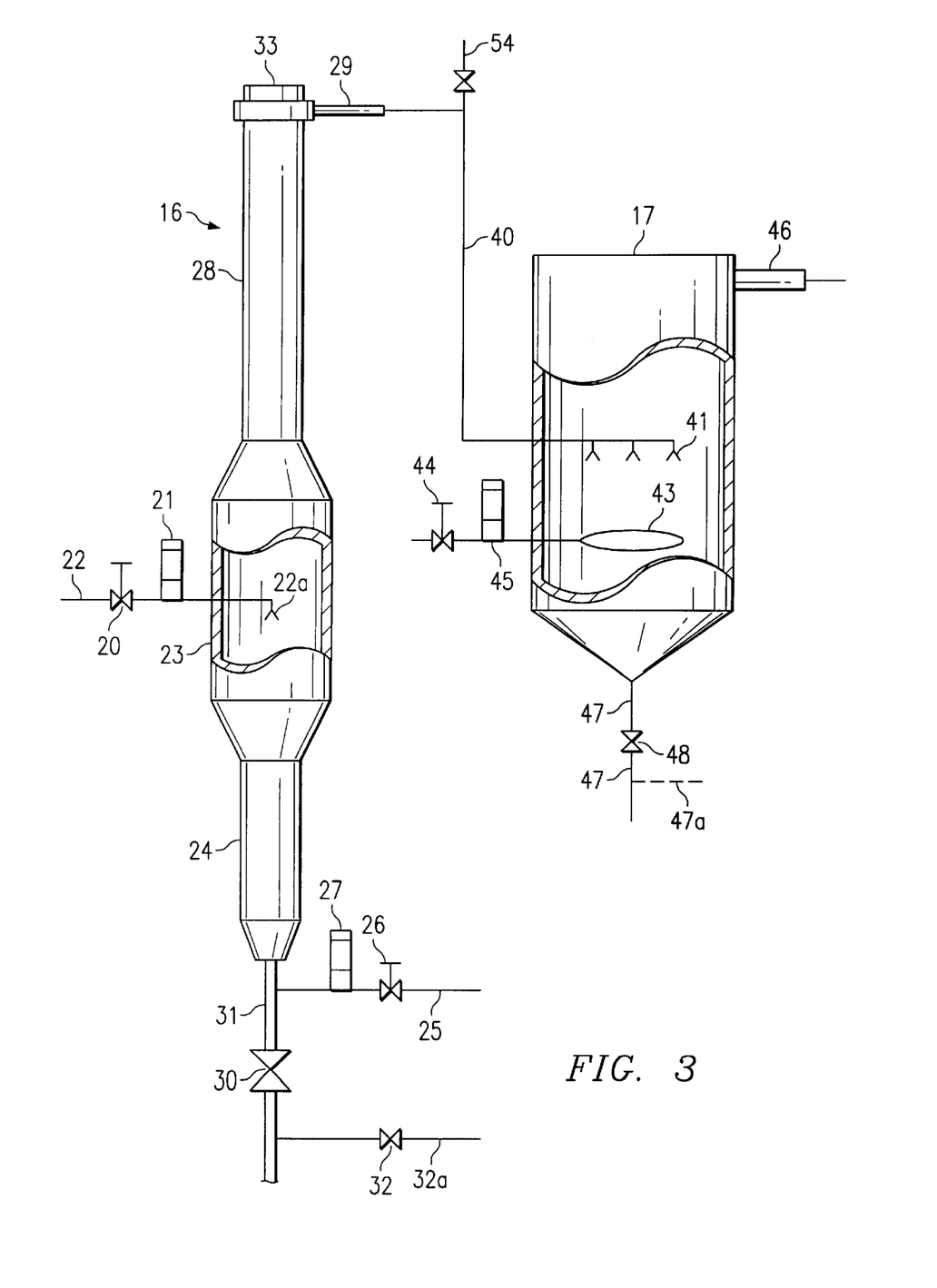
FIG. 3 is a plan view of a primary and secondary separation system.

Referring to FIG. 3, the slurried zeolite process stream is passed to a primary separation column 16. The primary separation column 16 utilizes distinct flow rates in conjunction with specific separation zones to separate and remove high density contaminants having limited surface area and minimal influence of demineralized water. A counterflow is used to suspend and to maintain the suspension of the higher surface area zeolite in the slurried zeolite process stream.

Still referring to FIG. 3, the slurried zeolite process stream is fed into the primary separation column 16 at approximately the midpoint of the column through line 22. Line 22 terminates in a nebulizing nozzle 22a which reduces the velocity and turbulent effect of the slurried zeolite process stream downward into an ascending demineralized water stream. The demineralized water stream arises from a feed of demineralized water into the lower portion of the primary separation column 16 through line 25. The primary separation column utilizes the variation in hydrating properties and mass to surface area ratios between the desired zeolite particles and clay contaminants as well as the additional affects of the electrical double layer to separate the zeolite from clay contaminant. That is, separation in the primary separation column is not solely a hydraulic effect. The demineralized water leaves the electrical double layer intact and there is an added separation effect due to the surface interactions between the electrical double layer on the surface of the particles and the demineralized water. Prior art hydraulic separation process, such as that discussed in U.S. Pat. No. 4,554,066, rely on high mass to surface area ratios typical of larger particles and in which the effects of the electrical double layer are negligible in comparison to hydraulic effects. Where such ratios are high, there is no separation benefit from surface interactions with the electrical double layer. In the present process, the particles do not have such high mass to surface area ratios and so the effect of the electrical double layer is not insignificant in comparison to the hydraulic effect. Once separated, the zeolite particles are suspended and passed through the upper stage 28 of the primary separation column 16 until they are removed through the overflow pipe 29 of the primary separation column 16. The upward flow in the primary separation column is less than would be required to suspend the heavies in the slurried zeolite process stream. The amount and rate of the added demineralized water and the upward flowrate of the water may vary depending upon the initial feedstock composition, the efficacy of upstream separations, the mean particle sizes of the zeolite and contaminants and the overflow extraction rate. As can be seen in FIG. 3, a mid-stage 23 of the column is larger in diameter than the upper stage 28 and lower stage 24 of the column 16. Such a larger diameter stage is often referred to as an expansion stage. The major part of the separation of the zeolite from the heavies in the slurried zeolite process stream occurs in the mid-stage 23. A transparent lower stage 24 is used to visually determine the efficacy of the separation in the primary separation column 16.

The flow of demineralized water may be controlled by a manual control valve 26 and monitored by flowmeter 27. It will be understood that although a manual operation is illustrated in FIG. 3, operation of the primary separation column 16 may be automated with currently available process control equipment. Similarly, the efficacy of separation by the primary separation column 16 may be determined automatically with currently available analytical equipment and techniques. For example, the overflow effluent from the primary separation column 16 exiting though overflow pipe 29 may be analyzed for particle size, density, and/or mineral content. If such analysis shows that an unacceptable level of heavy contaminants is being carried into the overflow effluent, the rate of demineralized water addition and overflow effluent extraction may be altered.

Referring still to FIG. 3, it can be seen that primary separation column 16 is capped by a cap 33 and that overflow pipe 29 lies immediately below cap 33. The resulting overflow effluent contains a zeolite product which may be collected through valve 54 and dewatered and dried for industrial applications. Alternatively, the overflow effluent of primary separation column 16 may be subjected to additional wet processing techniques, as discussed below, for specific product refinement.

Referring still to FIG. 3, undesirable heavy contaminants, including most typically, quartz, opal and iron, are removed through line 31 and valve 30. Additional water may be added to the heavy contaminant stream through line 32a and valve 32 to lower the viscosity of the heavy contaminant stream to assist in its removal. It will be understood that the heavy contaminant stream removed through valve 30 may be disposed of or recycled back through the primary separation column 16 through line 25 and valve 26 to recover any remaining zeolite content.

As seen in FIG. 3, additional wet processing of the overflow effluent from primary separation column 16 may be undertaken by passing the overflow effluent into a secondary separation column 17 through line 40 which terminates in one or more nebulizers 41 which are positioned at about the midpoint of the secondary separation column 17. Therein, the zeolite product is exposed to a final fines wash by the counterflow demineralized water entering through a flow distributor 43 at the base of the secondary separation column 17 through valve 44. The flow of demineralized water entering through valve 44 may be monitored by a flowmeter 45. Residual clay, mica, or other fine contaminants rise and pass through the overhead stream through overhead pipe 46 of the secondary separation column 17. The purified zeolite product is collected as an underflow effluent through line 47 and valve 48 in either a batch or continuous mode of transfer.

Figure 4:
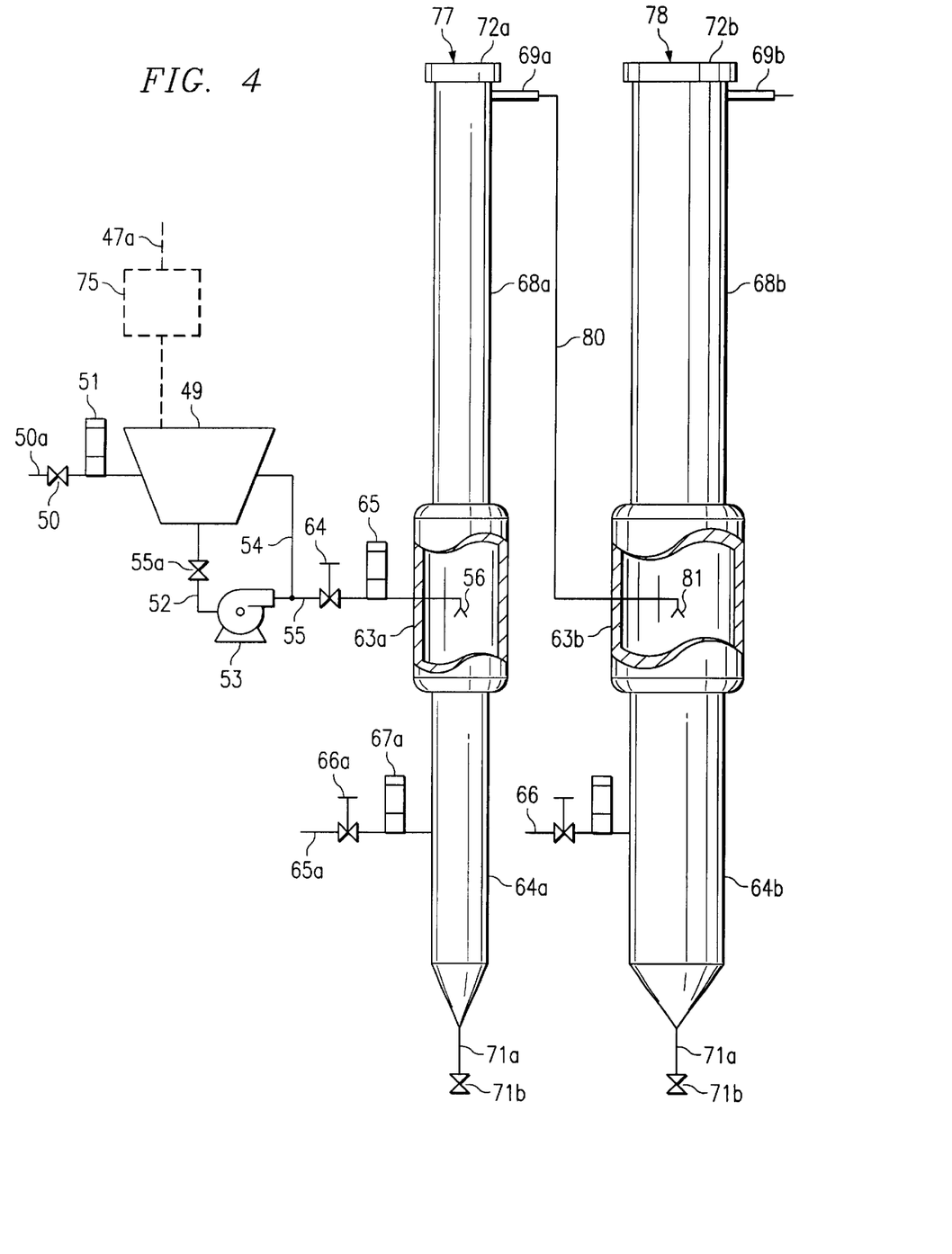
FIG. 4 is a plan view of a wet classifying system.

Additional wet classification of the underflow effluent from secondary separation column 17 may be undertaken to further separate the zeolite by particle size. FIG. 4 illustrates a multiple wet classifier system of one embodiment of the process of the present invention.

In one operational mode, underflow effluent from secondary separation column 17 is passed through line 47a and is transferred, with optional particle size reduction at 75, to suspension vessel 49 and combined with demineralized water injected through line 50a and valve 50. Again, the flow of demineralized water through valve 50 may be monitored with a flowmeter 51. A slurry is established in suspension vessel 49 using a recirculation-feed pump 53 through lines 52 and 54, and valve 55a. Forward feed to the wet classification system proceeds through line 55, which terminates in nebulizer 56 at about the midpoint of first classifying column 77, and regulating valve 64 to provide the desired flow rate at flowmeter 65, introduced into about the midpoint of the first wet classifying column 77.

In a second operational mode, overflow effluent from primary separation column 16 bypasses the secondary separation column and is passed to the wet classification system. In such second operational mode, overflow effluent from primary separation column 16 is injected into a first wet classifying column 77 through line 55 valve 64 and flowmeter 65.

First wet classifying column 77 utilizes distinct flow rates in conjunction with specific separation zones to separate the zeolite content by particle density, mineral phase and/or size. As shown in FIG. 4, first stage column 77 possesses an upper stage 68a, a midstage 63a and a lower stage 64a. Referring still to FIG. 4, the midstage 63a is larger in circumference than the upper stage 68a and lower stage 64a. Demineralized water is added, to amplify differences in particle settling velocity, to column 77 through pipe 65a being controlled at valve 66a and measured at flowmeter 67a to provide a flow countercurrent to descending zeolite in column 77. Column 77 is capped by cap 72a. The overflow effluent from column 77 is extracted through overflow pipe 69a and into pipe 80. Heavier and/or larger zeolite particles and any remaining heavy contaminants exit first classifying column 77 as underflow through pipe 71a and valve 71b which is located at or near the bottommost portion of column 77.

Referring still to FIG. 4, the overflow effluent from first classifying column 77 may be further processed by passage into about the midpoint of a second classifying column 78 through pipe 80, which terminates in nebulizer 81. Second classifying column 78 utilizes distinct flow rates in conjunction with specific separation zones to further separate the zeolite by particle size and/or mineral phase. Demineralized water is introduced into second classifying column 78 through pipe 66 within a lower stage 64b of second classifying column 78. Second classifying column 78 is capped by cap 72b and the overflow from column 78 exits through overflow pipe 69b. Smaller zeolite particles present in the overflow effluent from first classifying column 77 and injected into second classifying column 78 are suspended by a countercurrent stream of demineralized water and carried through an upper stage 68b to pipe 69b. Heavier or larger zeolite particles present in the overflow effluent from first classifying column 77 may be withdrawn from the bottom of second classifying column 78 through pipe 71 and valve 71b.

It will be understood that, as an alternative to further classification, all or a portion of the overflow effluent from first classifying column 77 may be collected and dried for end use or may be further processed by milling, magnetic separation or chemical leaching. Similarly, all or part of the overflow effluent from second classifying column 78 may be collected and dried for end use or may be further classified using additional classifying columns possessing finer separation properties, such as longer expansion zones or otherwise processed.

Although FIG. 4 illustrates a two column wet classification system, it will be understood that the number, sizes and configurations of the wet classifying columns may vary depending upon the extent and exactness of separation by particle size and/or mineral phase desired. That is, the narrower the range of particle size classification desired, the greater the number and/or size of classifying columns required. As with the primary separation column 16, the amount and rate of demineralized water addition and subsequent upward flowrate is dependent upon the particle size and/or desired yield of the overflow effluent, the particle size range of the process stream fed into the column, and the overflow extraction rate. It will be further understood that although the slurried zeolite process stream is prepared as a batch process in the preferred embodiment of the present invention, all subsequent steps in the present process may be run semi-continuously. The wet classification technique disclosed herein has not heretofore been applied in the processing of clay materials, in general, or of naturally occurring zeolites, in particular, and is a significant and substantial improvement over prior art methods as no other zeolite classifying technique has approached this level of zeolite enrichment and concurrent with particle size classification. As with the primary separation column, the wet classification method of the present invention relies upon the separation effect of the intact electrical double layer.

Each of the separation zones and capacities of primary separation column 16 and each of first and second classifying columns 77 and 78, respectively, may be regulated not only by the size and configurations of such columns but also by one or more downstream pumps. The component equipment, i.e., batch tanks, columns, piping, valves, meters, in-line probes and pumps, may be made from any of a variety of materials including glass, plastics, such as polyvinylchloride ("PVC"), and metal and metal alloys. Because the process does not utilize high temperatures or corrosive chemicals, cheaper materials of construction, such as PVC, may be used.

It will be recognized that all steps of the novel process are performed with demineralized water, absent chemical additives, as a common suspension fluid and may be conducted in series and without either neutralizing chemical treatments or rinsing operations to remove a chemical background, as required of prior art methods.

The preparations of demineralized water for use in the process of the present invention can be accomplished by various methods in common use. By way of example, a water source having in excess of 1500 ppm total electrolytes may be processed using a combination of filtration, reverse osmosis and ion exchange steps.

It was unexpectedly discovered that the electrolyte content of some process effluents, particularly after the initial clay removal step, remained remarkably low and allowed the option of recycle by minimal treatment by filtration and ion exchange and to substantially restore the original quality. The absence of chemical additives, common to processes of the prior art, was a principal factor in feasibility and economic treatment of water effluent from the novel process. This demonstrated that the economic advantage of the process could be enhanced not only by the recycle but also by avoidance of large inventories of wastewater common to the prior art methods. This reduces demand on water resources, particularly in areas of limited supplies. Therefore, the preferred embodiment substantially adds to both the economic and environmental advantages of the novel process, as well as the overall process performance.

The process of the present invention is further illustrated by reference to the examples below.

EXAMPLE 1

Bench Scale Demonstration of the Novel Process
Batch Clay Separation Step

A 15 lb batch of zeolite ore containing 45% clinoptilolite, 20% mordenite, 15% feldspar, 10% clay, 5% mica and 5% quartz was pulverized to a mean particle size of approximately 11 microns. The material provided a TAPPI brightness of 72.7, a cation exchange capacity of 1.10 meq/g, and a FeO concentration of 1.20%. The pulverized ore was mixed with 7.9 gallons of demineralized water, having less than about 10 ppm electrolytes, to form a slurry of 23% solids. The slurry was mixed in a batch fashion using a blender at high speed for 10 minutes per batch. The dispersed slurry was distributed into 5-gallon containers and allowed to settle for 24 hours. Following the settling period, the clay liquid suspension was decanted from the settled slurry providing 12.8 lbs of zeolite solids remaining in the containers, which provided a yield of 85% for this step.

Analysis of the material from the clay liquid suspension indicated that it consisted of 50% clay, 25% clinoptilolite, 15% feldspar, 5% mordenite, and 5% quartz with a FeO concentration of 2.97%. It also demonstrated a TAPPI brightness of 61.3 and a cation exchange capacity of 0.78 meq/g.

Analysis of the zeolite material provided 55% clinoptilolite, 15% mordenite, 15% feldspar, 5% clay, 5% mica, and 5% quartz. The material provided a TAPPI brightness of 72.0, a cation exchange capacity of 1.21 meq/g, and a FeO concentration of 0.66%.

Continuous Primary Separator Step

The zeolite solids were transferred to a 25-gallon tank and mixed with 15.4 gallons of demineralized water to form a 10% slurry. The slurry was mixed by recirculation with a submersible sump pump, which was attached to a bench scale version of the system described in FIG. 3. A counter flow of demineralized water, having less than about 10 ppm electrolytes, was introduced at the base of the separator column to provide a rise rate of 4.3 milliliters per minute per square centimeter in the lower section of the column. Feed from the slurry tank to the column was initiated to establish a rise rate of 3.8 milliliters per minute per square centimeter in the injection zone of the column. The entire slurry volume was pumped to the column, then the feed was secured and the counter flow demineralized water was balanced to maintain the standard rise rates for an additional 12 hours.

Approximately 1 lb of discard material was collected at the bottom of the column as underflow concentrate. Analysis of this material indicated that it consisted of 35% quartz, 25% feldspar, 15% clinoptilolite, 10% mordenite, 5% clay, 5% mica, and 5% hematite with a FeO concentration of 1.66%. It also demonstrated a cation exchange capacity of 0.66 meq/g and a TAPPI brightness of 53.7.

The final purified zeolite product collected in the secondary separation column totaled 11.5 lbs., which provided a yield of 90% for this step. This material consisted of 55% clinoptilolite, 15% mordenite, 15% feldspar, 5% clay and 5% quartz with a FeO concentration of 0.55%. It also demonstrated a cation exchange capacity of 1.22 meq/g and a TAPPI brightness of 71.5.

Magnetic Separation Step

The purified zeolite product was mixed with 7.6 gallons of demineralized water, having less than about 10 ppm electrolytes, to form a 20% slurry. The slurry was manually treated with rare earth magnets (6 kG) in a static soak system. A total of 1 lb of magnetic material was extracted from the zeolite leaving 10.5 lbs. of purified material, which is a yield of 91% for this step. The material provided a 86.0 TAPPI brightness, a cation exchange capacity of 1.33 meq/g, and a FeO concentration of 0.31%. Mineral analysis of the material indicated that it consisted of 60% clinoptilolite, 20% mordenite, 15% feldspar, and 5% quartz (clay and mica less than detectable).

Particle Size Reduction Step

A 6.9 lb portion of the magnetically separated zeolite was ground dry to a mean particle size of approximately 3 microns using a model 4 micro-jet system from Fluid Energy Aljet. The ground product provided a 90.5 TAPPI brightness, a cation exchange capacity of 1.26 meq/g, and a FeO concentration of 0.31%.

Summary of Processing

| Sample | Zeolite % | CEC meq/g | Brightness TAPPI | FeO % |
|---|---|---|---|---|
| Feed Ore | 65 | 1.10 | 72.7 | 1.20 |
| Decanted Zeolite | 70 | 1.21 | 72.0 | 0.66 |
| Clay Liquid Suspension | 25 | 0.78 | 61.3 | 2.97 |
| Primary Separator Underflow | 25 | 0.66 | 53.7 | 1.66 |
| Secondary Separator Product | 70 | 1.22 | 71.5 | 0.55 |
| Magnetic Treatment Product | 80 | 1.33 | 86.0 | 0.31 |
| 3 micron Product | 80 | 1.26 | 90.5 | 0.31 |

EXAMPLE 2

Pilot Scale Demonstration of the Novel Process

Batch Clay Separation Step

A 180 lb batch of zeolite ore containing 45% clinoptilolite, 20% mordenite, 15% feldspar, 10% clay, 5% mica and 5% quartz was pulverized to a mean particle size of approximately 12 microns. The material provided a TAPPI brightness of 72.0, a cation exchange capacity of 1.11 meq/g, and a FeO concentration of 1.29%. The pulverized ore was mixed with 86 gallons of demineralized water, having less than about 50 ppm electrolyte, in a tank to form a slurry of 20% solids. The slurry was mixed with rapid agitation using a Chemineer (model 5JTC) tank mixer for one hour. Mixing was then stopped and the slurry was allowed to settle for 24 hours. Following settling, the liquid phase was decanted from the tank using a submersible sump pump. The separated zeolite product remaining in the tank totaled 151 lbs., which provided a 83% yield.

Analysis of the material from the clay liquid suspension indicated that it consisted of 50% clay, 25% clinoptilolite, 15% feldspar, 5% mordenite, and 5% quartz with a FeO concentration of 2.97%.

Analysis of the zeolite material provided 55% clinoptilolite, 15% mordenite, 15% feldspar, 5% clay and 5% quartz. The material provided a TAPPI brightness of 72.0, a cation exchange capacity of 1.21 meq/g, and a FeO concentration of 0.66%.

Continuous Primary Separator Step

The separated zeolite product remaining in the tank, from the proceeding step, was mixed with 160 gallons of demineralized water, having less than about 50 ppm electrolyte, to form a 10% slurry. The slurry was mixed with rapid agitation using the Chemineer tank mixer for 10 minutes. The mixer was removed and the submersible sump pump was returned to the tank for internal recirculation. A small slipstream was passed over a reduced scale rare earth magnet solely to demonstrate feasibility of effective removal of magnetic material at this step of the process.

A second submersible sump pump was placed in the tank and connected to a pilot scale separation column based on the design described in FIG. 3. Demineralized water, having less than about 50 ppm electrolyte, was delivered to the column base to provide a rise rate of 4.3 milliliters per minute per square centimeter in the lower section of the column. Zeolite slurry feed was initiated to the column with the sump pump to establish a rise rate of 3.8 milliliters per minute per square centimeter in the injection zone of the column. Demineralized water flow was also established at the secondary separation column distribution ring to provide a rise rate of 0.5 milliliters per minute per square centimeter. Following the addition of the contents of the slurry tank to the primary column, demineralized water was continued at the column base and secondary separation column distribution ring, maintaining the standard rise rates, for an additional 12 hours. The final yield of purified zeolite product was 134 lbs., which provided a yield of 89% for this step. Analysis of the zeolite product provided 65% clinoptilolite, 15% mordenite, 10% feldspar, 5% mica, and 5% quartz (clay less than detectable). The material provided a TAPPI brightness of 67.0, a cation exchange capacity of 1.33 meq/g, and a FeO concentration of 0.68%.

Approximately 29 lbs. of discard material was collected at the bottom of the column as underflow concentrate. Analysis of this material indicated that it consisted of 35% quartz, 25% feldspar, 15% clinoptilolite, 10% mordenite, 5% clay, 5% mica, and 5% hematite with a FeO concentration of 1.66%. It also demonstrated a cation exchange capacity of 0.66 meq/g and a TAPPI brightness of 53.7.

Magnetic Separation Step 1

A 143 lb. sample of purified zeolite product from the column system was slurried with 28 gallons of demineralized water to 38% solids and mixed with a standard drum mixer. The slurry was subjected to magnetic separation by passing it through a Pacific Electric Motor Company (PEM) high intensity (20 kG) wet magnetic separator equipped with a 5 inch diameter canister filled with expanded metal at 3 gallons per minute (30 second retention). The entire volume of slurry was passed through the magnet two times during the treatment. Analysis of the material provided a TAPPI brightness of 77.7 and a FeO concentration of 0.50%.

Particle Size Reduction Step

The product from the magnetic separation was then subjected to particle size reduction using a Chicago Boiler Red Head attrition mill equipped with one-millimeter glass beads at a flow rate of one gallon per minute. Four passes through the mill were required to achieve a particle size of less than 2 microns. The milled product was then screened with a 200-mesh screen to remove stray grinding media and mill wear products. Analysis of the material demonstrated a TAPPI brightness of 84.0 and a FeO concentration of 0.35%.

Magnetic Separation Step 2

The attrition mill product was subjected to magnetic separation again by passing it through the PEM high intensity (2 tesla) wet magnetic separator equipped with a 5 inch diameter canister filled with stainless steel wool at 1 gallon per minute (100 second retention). The entire volume of slurry was passed through the magnet two times during the treatment. The final product was estimated to 106 lbs. in the form of a 17% solids slurry. This provided a zeolite product yield of 74%. A sample of the dried material displayed a TAPPI brightness of 89.9, a FeO concentration of 0.32 and a particle size of less than 2 microns.

Summary of Processing

| SAMPLE | Zeolite | CEC | Brightness | FeO |
|---|---|---|---|---|
| Feed Ore | 65 | 1.33 | 66.7 | 1.27 |
| Decanted Zeolite | 70 | 1.43 | 66.4 | 0.71 |
| Clay Liquid Suspension | 40 | 0.81 | 61.3 | 2.97 |
| Primary Separator Underflow | 40 | 0.66 | 53.7 | 1.66 |
| Secondary Separator Product | 80 | 1.45 | 66.2 | 0.68 |
| Pass 1 Magnetic Separation | | | 73.8 | 0.58 |
| Pass 2 Magnetic Separation | | | 77.7 | 0.50 |
| Attrition Mill Product | | | 84.0 | 0.35 |
| Pass 3 Magnetic Separation | | | 89.1 | 0.31 |
| Pass 4 Magnetic Separation | | 1.70 | 89.9 | 0.32 |

EXAMPLE 3

Bench Scale Demonstration of Classifier Process

Five bench scale columns based on the design described in FIG. 4 were connected in series. Rise rates were established in the lower sections of the first and second columns with counter flow demineralized water at 0.99, and 0.22 milliliters per minute per square centimeter. A sample of zeolite product from the primary separator column was slurried to 10% solids with demineralized water, having an electrolyte content of less than about 10 ppm. The slurry was fed to the first column to establish a rise rate within the injection zone of 0.86 milliliters per minute per square centimeter and subsequent columns having slightly reduced rise rates. The entire slurry volume was pumped to the classifier, then feed was secured and the counter flow at the column bases was maintained for 12 hours.

The material that settled out at the bottom of each column was collected as underflow and analyzed. The data is summarized below:

Analysis of Classifier System Products

| Sample | Mass (%) | FeO (%) | Apparent Density (g/ml) |
|---|---|---|---|
| Primary Separator Product | — | 0.66 | 0.89 |
| Column 1 Product | 59 | 0.86 | 0.86 |
| Column 2 Product | 22 | 0.67 | 0.82 |
| Column 3 Product | 11 | 1.04 | 0.79 |
| Column 4 Product | 7 | 1.07 | 0.75 |
| Column 5 Product | 1 | 2.56 | 0.73 |

The data reflects linear reduction of apparent density from about 0.86 g/ml to about 0.73 g/ml from which a linear particle size reduction is inferred from about 8.2 to 6.5 microns or about 0.5 microns for each classifier column. The enhanced iron content, especially column 5, reflects further separation of trace residual clays or other iron containing minerals.

EXAMPLE 4

Bench Scale Demonstration of Classification Process

Five bench scale columns based on the design described in FIG. 4 were connected in series. Rise rates were established in the lower sections of the first and second columns with counter flow demineralized water at 1.5, and 0.35 milliliters per minute per square centimeter. A sample of zeolite product from the particle size reduction step of Example 1 (i.e., 3 micron Product) was slurried to 10% solids with demineralized water, having an electrolyte content of less than about 10 ppm. The slurry was fed to the first column to establish a rise rate within the injection zone of 0.88 milliliters per minute per square centimeter and subsequent columns having slightly reduced rise rates. The entire slurry volume was pumped to the classifier, then feed was secured and the counter flow at the column bases was maintained for 12 hours.

The material that settled out at the bottom of each column was collected as underflow and analyzed. The data is summarized below:

Analysis of Classifier System Products

| Sample | Mass (%) | FeO (%) | CEC | Apparent Density |
|---|---|---|---|---|
| Feed Product | — | 0.25 | 1.35 | — |
| Column 1 Product | 7 | 0.19 | 1.03 | 1.08 |
| Column 2 Product | 11 | 0.16 | 1.31 | 0.92 |
| Column 3 Product | 32 | 0.23 | 1.51 | 0.78 |

-continued

| Sample | Mass (%) | FeO (%) | CEC | Apparent Density |
|---|---|---|---|---|
| Column 4 Product | 26 | 0.22 | 1.53 | 0.72 |
| Column 5 Product | 24 | 0.36 | 1.46 | 0.60 |

The data reflects linear reduction of apparent density from about 1.08 g/ml to 0.6 g/ml from which is inferred a linear and relatively small average particle size difference. The iron distribution reflects further separation from the zeolite in columns 1 through 4 and enhancement in the column 5 product, reflecting further separation of trace residual clays or other iron containing minerals. The cation exchange capacity revealed collection of a small fraction of zeolite depleted mineral in column 1 and significant enhancement in columns 3 and 4 and somewhat lesser extent in column 5. This distribution clearly demonstrated beneficial separation concurrent with particle size classification. Composite sample of columns 3 and 4 provided a 91.2 TAPPI brightness compared to the feed product having a TAPPI brightness of 90.5.

The present invention is set forth herein in terms of specific embodiments thereof. However, it will be understood in view of the disclosure contained herein that one of ordinary skill in the art is enabled to practice numerous variations of the invention. Such variations are within the scope of the disclosure herein. Consequently, the invention is to be broadly construed and limited only by the scope and spirit of the claims appended hereto.

What is claimed is:

1. A method for classification of a particulate mineral compound, said compound including particles possessing an electrical double layer when hydrated in low electrolyte medium and having a range of particle sizes, comprising:

preparing an aqueous slurry of said particulate mineral compound, said aqueous slurry having a slurry density of 5% to 40%;

introducing said slurry into a countercurrent classifying column, said classifying column having one or more stages, a feed injection port at about the midpoint of said classifying column, a demineralized water injection port below said feed injection port, a cap at such column's topmost edge, and an overflow port below said cap;

injecting demineralized water into said countercurrent classifying column at said demineralized water injection port so as to form an ascending demineralized water stream sufficient to amplify differences in particle settling velocity;

separating said particulate compound using the separation effect of said electrical double layer; and extracting an overflow stream through said overflow port.

2. The method of claim 1, wherein said particulate mineral compound is a zeolite compound comprising particles of a desired range of sizes from a lower portion of a secondary separation column.

3. The method of claim 1, wherein the particulate mineral compound is a zeolite compound.

4. The method of claim 1, wherein the aqueous slurry has a slurry density of 10% to 20%.

5. The method of claim 1, wherein the demineralized water has a low electrolyte content.

6. The method of claim 5 wherein the demineralized water has an electrolyte content of less than about 500 ppm.

7. The method of claim 6, wherein the demineralized water has an electrolyte content of less than about 50 ppm.

8. The method of claim 5, wherein the demineralized water has an electrolyte content of less than about 100 ppm.

9. The method of claim 8, wherein the demineralized water has an electrolyte content of less than about 100 ppm.

* * * * *